US011875210B2

(12) United States Patent
Yamawaki et al.

(10) Patent No.: US 11,875,210 B2
(45) Date of Patent: Jan. 16, 2024

(54) WIRELESS COMMUNICATION DEVICE AND METHOD OF MANUFACTURING SAME

(71) Applicant: Murata Manufacturing Co., Ltd., Nagaokakyo (JP)

(72) Inventors: Yoshinori Yamawaki, Nagaokakyo (JP); Ryosuke Washida, Nagaokakyo (JP); Noboru Kato, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 365 days.

(21) Appl. No.: 17/380,544

(22) Filed: Jul. 20, 2021

(65) Prior Publication Data
US 2021/0350199 A1 Nov. 11, 2021

Related U.S. Application Data

(63) Continuation of application No. PCT/JP2019/038771, filed on Oct. 1, 2019.

(30) Foreign Application Priority Data

Jan. 25, 2019 (JP) .................................. 2019-011366

(51) Int. Cl.
*G06K 19/077* (2006.01)
*G06K 19/07* (2006.01)

(52) U.S. Cl.
CPC ... *G06K 19/07752* (2013.01); *G06K 19/0723* (2013.01); *G06K 19/07722* (2013.01);
(Continued)

(58) Field of Classification Search
CPC ......... G06K 19/07752; G06K 19/0723; G06K 19/07722; G06K 19/07779; G06K 19/07728; G06K 19/07747
See application file for complete search history.

(56) References Cited

U.S. PATENT DOCUMENTS 6,779,733 B2 * 8/2004 Akita ............... G06K 19/07718
235/492
6,853,087 B2 * 2/2005 Neuhaus ................. H01L 24/31
257/758
(Continued)

FOREIGN PATENT DOCUMENTS

JP 2008086038 A 4/2008
JP 2009027291 A 2/2009
(Continued)

OTHER PUBLICATIONS

Translation of jp 2009-027291 (Year: 2009).*
(Continued)

*Primary Examiner* — Albert K Wong
(74) *Attorney, Agent, or Firm* — ArentFox Schiff LLP

(57) ABSTRACT

A wireless communication device is provided that includes an RFIC module in which an RFIC chip and first and second terminal electrodes are incorporated, and an antenna member including an antenna base material and antenna patterns including first and second coupling portions. The RFIC module and the antenna member are bonded to each other via an insulating first adhesive layer. Between the first terminal electrode and the first coupling portion and between the second terminal electrode and the second coupling portion, a distance t1 from a surface of the RFIC module in contact with the first adhesive layer to the first and second terminal electrodes is larger than a thickness t2 of the first adhesive layer.

20 Claims, 12 Drawing Sheets

(52) U.S. Cl.
CPC . *G06K 19/07728* (2013.01); *G06K 19/07747* (2013.01); *G06K 19/07779* (2013.01)

(56) References Cited

U.S. PATENT DOCUMENTS

| | | | | |
|---|---|---|---|---|
| 6,940,408 | B2* | 9/2005 | Ferguson | G06K 19/07752 343/873 |
| 7,224,278 | B2* | 5/2007 | Phaneuf | B31D 1/025 340/572.1 |
| 7,843,341 | B2* | 11/2010 | Phaneuf | G06K 19/07752 340/572.1 |
| 8,042,742 | B2* | 10/2011 | Kagaya | G06K 19/07718 235/492 |
| 8,381,997 | B2 | 2/2013 | Osamura et al. | |
| 9,390,364 | B2* | 7/2016 | Finn | G06K 19/07754 |
| 9,582,747 | B2* | 2/2017 | Saito | G06K 19/07722 |
| 10,198,686 | B2* | 2/2019 | Carrier | G06K 19/07794 |
| 10,846,583 | B1* | 11/2020 | Koepp | G06K 19/07754 |
| 11,341,389 | B2* | 5/2022 | Lotya | G06K 19/07745 |
| 11,755,873 | B1* | 9/2023 | Finn | G06K 19/07728 235/492 |
| 2004/0082111 | A1* | 4/2004 | Yamauchi | H01L 24/81 257/E21.511 |
| 2007/0164414 | A1 | 7/2007 | Dokai et al. | |
| 2012/0074229 | A1 | 3/2012 | Osamura et al. | |
| 2016/0350638 | A1 | 12/2016 | Kato et al. | |
| 2018/0060717 | A1 | 3/2018 | Kato et al. | |
| 2019/0138873 | A1 | 5/2019 | Kato et al. | |
| 2019/0138876 | A1* | 5/2019 | Nakano | G06K 19/07786 |
| 2019/0156073 | A1* | 5/2019 | Finn | G06K 19/07743 |
| 2020/0125917 | A1* | 4/2020 | Besnier | G06K 19/07754 |
| 2021/0227737 | A1* | 7/2021 | Yamawaki | G06K 19/07749 |
| 2023/0027226 | A1* | 1/2023 | Lotya | H01Q 7/00 |

FOREIGN PATENT DOCUMENTS

| | | |
|---|---|---|
| WO | 2010140429 A1 | 12/2010 |
| WO | 2016072335 A1 | 5/2016 |

OTHER PUBLICATIONS

International Search Report issued for PCT/JP2019/038771, dated Dec. 3, 2019.
Written Opinion of the International Searching Authority issue for PCT/JP2019/038771, dated Dec. 3, 2019.

* cited by examiner

Fig.1
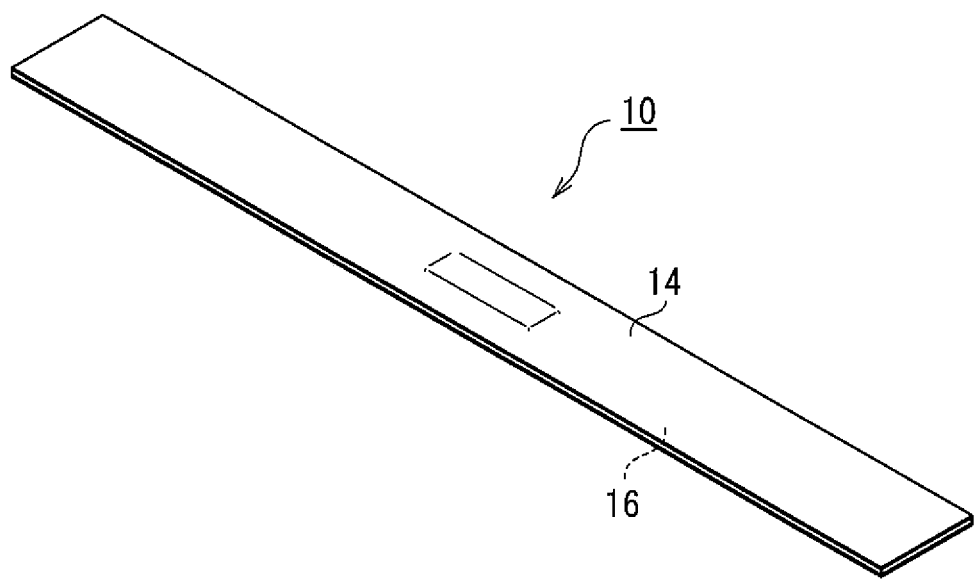
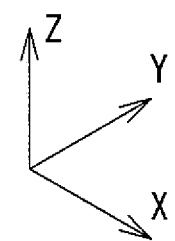

WIRELESS COMMUNICATION DEVICE AND METHOD OF MANUFACTURING SAME

CROSS REFERENCE TO RELATED APPLICATIONS

The present application is a continuation of PCT/JP2019/038771 filed Oct. 1, 2019, which claims priority to Japanese Patent Application No. 2019-011366, filed Jan. 25, 2019, the entire contents of each of which are incorporated herein by reference.

TECHNICAL FIELD

The present invention relates to a wireless communication device and a method of manufacturing the wireless communication device.

BACKGROUND

WO 2016/072335 (hereinafter "Patent Document 1") discloses a wireless communication device having an RFIC (Radio-Frequency Integrated Circuit) element (RFIC module) and a radiation conductor (antenna pattern) electrically connected to a terminal electrode of the RFIC element. Specifically, the terminal electrode of the RFIC element is not fixed to the radiation conductor by solder etc., and an electrical connection between the terminal electrode of the RFIC element and the radiant conductor is maintained by affixing a seal covering the RFIC element to a base material provided with the radiation conductor.

However, for the wireless communication device described in Patent Document 1, since the terminal electrode of the RFIC element and the radiation conductor are not fixed to each other, variation may occur in a contact resistance therebetween, i.e., variation may occur in electrical characteristics. As a result, variation may occur in the communication characteristics of the wireless communication device.

SUMMARY OF THE INVENTION

Therefore, the exemplary embodiments of the present invention provided a wireless communication device in which a terminal electrode of an RFIC module including an RFIC chip is electrically connected to an antenna in a wireless communication device while suppressing variation in electrical characteristics.

According to an exemplary aspect of the present invention, a wireless communication device is provided that includes an RFIC module in which an RFIC chip and first and second terminal electrodes connected to the RFIC chip are incorporated. Moreover, the device includes an antenna member including an antenna base material and an antenna pattern disposed on the antenna base material and including first and second coupling portions facing the first and second terminal electrodes of the RFIC module. In the exemplary aspect, the RFIC module and the antenna member are bonded to each other by an insulating first adhesive layer interposed therebetween, and between the first terminal electrode and the first coupling portion and between the second terminal electrode and the second coupling portion, a distance from a surface of the RFIC module in contact with the first adhesive layer to the first and second terminal electrodes is larger than a thickness of the first adhesive layer.

According to another exemplary aspect of the present invention, a method of manufacturing a wireless communication device is provided that includes preparing an RFIC module in which an RFIC chip and first and second terminal electrodes connected to the RFIC chip are incorporated; preparing an antenna member including an antenna base material and an antenna pattern disposed on the antenna base material and including first and second coupling portions facing the first and second terminal electrodes of the RFIC module; bonding the RFIC module and the antenna member to each other by an insulating first adhesive layer interposed therebetween; and interposing the first adhesive layer between a cover layer of the RFIC module and the antenna member so that a distance from a surface of the RFIC module in contact with the first adhesive layer to the first and second terminal electrodes is larger than a thickness of the first adhesive layer, between the first terminal electrode and the first coupling portion and between the second terminal electrode and the second coupling portion.

According to the exemplary embodiments of the present invention, the terminal electrode of the RFIC module including the RFIC chip and the antenna can electrically be connected in the wireless communication device while suppressing variation in electrical characteristics.

BRIEF DESCRIPTION OF DRAWINGS

FIG. 1 is a perspective view of a wireless communication device according to an exemplary embodiment.

DETAILED DESCRIPTION OF EMBODIMENTS

Figure 2:
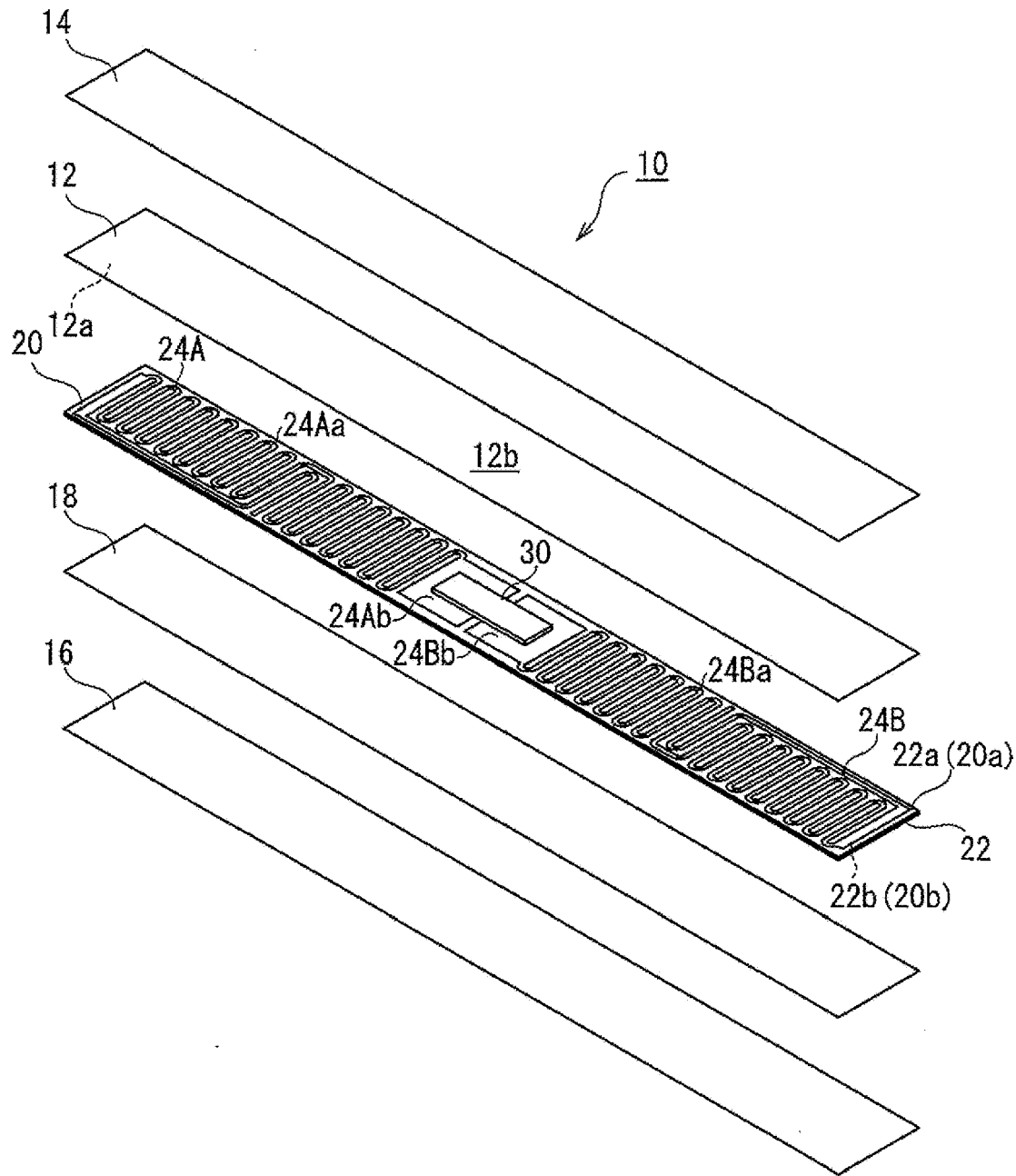
FIG. 2 is an exploded perspective view of the wireless communication device.

A wireless communication device according to an exemplary aspect includes an RFIC module in which an RFIC chip and first and second terminal electrodes connected to the RFIC chip are incorporated. Moreover, the device includes an antenna member including an antenna base material and an antenna pattern disposed on the antenna base material and including first and second coupling portions facing the first and second terminal electrodes of the RFIC module. According to the exemplary aspect, the RFIC module and the antenna member are bonded to each other by an insulating first adhesive layer interposed therebetween, and between the first terminal electrode and the first coupling portion and between the second terminal electrode and the second coupling portion, a distance from a surface of the RFIC module in contact with the first adhesive layer to the first and second terminal electrodes is larger than a thickness of the first adhesive layer.

According to the exemplary aspect, in a wireless communication device, the terminal electrodes of the RFIC module including the RFIC chip and an antenna can electrically be connected while suppressing variations in electrical characteristics.

For example, the RFIC module can include a module base material, with the RFIC chip disposed on the module base material, the first and second terminal electrodes disposed on the module base material and connected to the RFIC chip, and an insulating cover layer disposed on the module base material to cover the first and second terminal electrodes. In this configuration, the cover layer of the RFIC module and the antenna member are bonded to each other by an insulating first adhesive layer interposed therebetween, and, between the first terminal electrode and the first coupling portion and between the second terminal electrode and the second coupling portion, the thickness of the cover layer of the RFIC module is larger than the thickness of the first adhesive layer.

In an exemplary aspect, the cover layer can include a cover sheet made of an insulating material and an insulating second adhesive layer interposed between the cover sheet and the module base material to bond the cover sheet and the module base material to each other.

In an exemplary aspect, the module base material can be a single sheet-shaped member, the RFIC chip may be disposed on a first principal surface of the module base material, and the first and second terminal electrodes may be disposed on a second principal surface on the side opposite to the first principal surface.

In an exemplary aspect, a package layer can be disposed on the entire first principal surface of the module base material so that the RFIC chip is embedded.

In an exemplary aspect, the RFIC module can include a matching circuit for matching between the RFIC chip and the first and second terminal electrodes.

According to another exemplary embodiment, a method of manufacturing a wireless communication device is provided that includes preparing an RFIC module in which an RFIC chip and first and second terminal electrodes connected to the RFIC chip are incorporated; preparing an antenna member including an antenna base material and an antenna pattern disposed on the antenna base material and including first and second coupling portions facing the first and second terminal electrodes of the RFIC module; bonding the RFIC module and the antenna member to each other by an insulating first adhesive layer interposed therebetween; and interposing the first adhesive layer between a cover layer of the RFIC module and the antenna member so that a distance from a surface of the RFIC module in contact with the first adhesive layer to the first and second terminal electrodes is larger than a thickness of the first adhesive layer, between the first terminal electrode and the first coupling portion and between the second terminal electrode and the second coupling portion.

According to this exemplary aspect, in a wireless communication device, the terminal electrodes of the RFIC module including the RFIC chip and an antenna can electrically be connected while suppressing variations in electrical characteristics.

In an exemplary aspect, the first adhesive layer may be a liquid adhesive agent before curing and, in this case, the RFIC module may be mounted on the antenna member after the liquid adhesive agent is applied to the cover layer of the RFIC module.

Exemplary embodiments of the present invention will now be described with reference to the drawings.

FIG. 1 is a perspective view of a wireless communication device according to an exemplary embodiment, and FIG. 2 is an exploded perspective view of the wireless communication device. In the figures, an X-Y-Z coordinate system is provided for facilitating understanding of the exemplary embodiment and does not limit the invention. An X-axis direction indicates a longitudinal direction, a Y-axis direction indicates a width direction, and a Z-axis direction indicates a thickness direction of the wireless communication device.

As shown in FIG. 1, the wireless communication device 10 has a strip shape (elongated rectangular shape) and is used as a so-called RFID (Radio-Frequency IDentification) tag.

Specifically, as shown in FIG. 2, the wireless communication device 10 has an antenna member 20 and an RFIC (Radio-Frequency Integrated Circuit) module 30 disposed on the antenna member 20. In this embodiment, the wireless communication device 10 has a double-sided tape 12, a mount 14, a print label 16, and an adhesive layer 18 as elements for use as an RFID tag.

The double-sided tape 12 is a flexible tape and includes sticking surfaces 12*a*, 12*b* opposite to each other in the thickness direction (Z-axis direction). In this embodiment, the one sticking surface 12*a* is affixed to an entire first principal surface 20*a* of the antenna member 20 provided with the RFIC module 30. As a result, the double-sided tape 12 functions as a cover member protecting the first principal surface 20*a* of the antenna member 20, i.e., covering and protecting the RFIC module 30. The other sticking surface 12*b* is used when the wireless communication device 10 is affixed to an article, and is covered and protected by the mount 14 when not in use.

On the print label 16, for example, information about an article (e.g., an article name and a barcode) to which the wireless communication device 10 is affixed as the RFID tag is printed. For example, the information is printed on the print label 16 by a printer. The print label 16 is affixed to a second principal surface 20*b* of the antenna member 20 via the adhesive layer 18 that is a layer of an adhesive agent.

As shown in FIG. 2, the antenna member 20 of the wireless communication device 10 has a strip shape (e.g., an elongated rectangular shape) and includes an antenna base material 22 and first and second antenna patterns 24A, 24B disposed on one surface 22*a* of the antenna base material 22 (i.e., the first principal surface 20*a* of the antenna member 20).

In the exemplary aspect, the antenna base material 22 is a flexible sheet-shaped member made of an insulating material such as a polyimide resin. The antenna base material 22 includes surfaces 22*a*, 22*b* functioning as the first principal surface 20*a* and the second principal surface 20*b* of the antenna member 20.

The first and second antenna patterns 24A, 24B are configured as an antenna for the wireless communication device 10 wirelessly communicating with an external communication device (e.g., a reader/writer device when the wireless communication device 10 is used as an RFID tag). In this embodiment, the first and second antenna patterns 24A, 24B are conductor patterns made of a conductor material such as silver, copper, or aluminum, for example.

Moreover, the first and second antenna patterns 24A, 24B have radiating portions 24Aa, 24Ba for transmitting and receiving radio waves and coupling portions 24Ab, 24Bb (first and second coupling portions) for electrically connecting to the RFIC module 30.

In this embodiment, the radiating portions 24Aa, 24Ba of the first and second antenna patterns 24A, 24B are dipole antennas and have a meander shape. The radiation portions 24Aa and 24Ba respectively extend from the first and second coupling portions 24Ab, 24Bb disposed in a central portion in the longitudinal direction (X-axis direction) of the antenna base material 22 toward both ends of the antenna base material 22 and make a U-turn at the ends. As a result, leading ends (open ends) are capacitively coupled to central portions of the radiating portions 24Aa, 24Ba, so that the first and second antenna patterns 24A, 24B can resonate at a predetermined resonance frequency (e.g., the communication frequency).

Although details will be described later, the first and second coupling portions 24Ab, 24Bb of the first and second antenna patterns 24A, 24B are electrically connected to first and second terminal electrodes of the RFIC module 30. In the embodiment, each of the first and second coupling portions 24Ab, 24Bb is a rectangular land portion.

Figure 3:
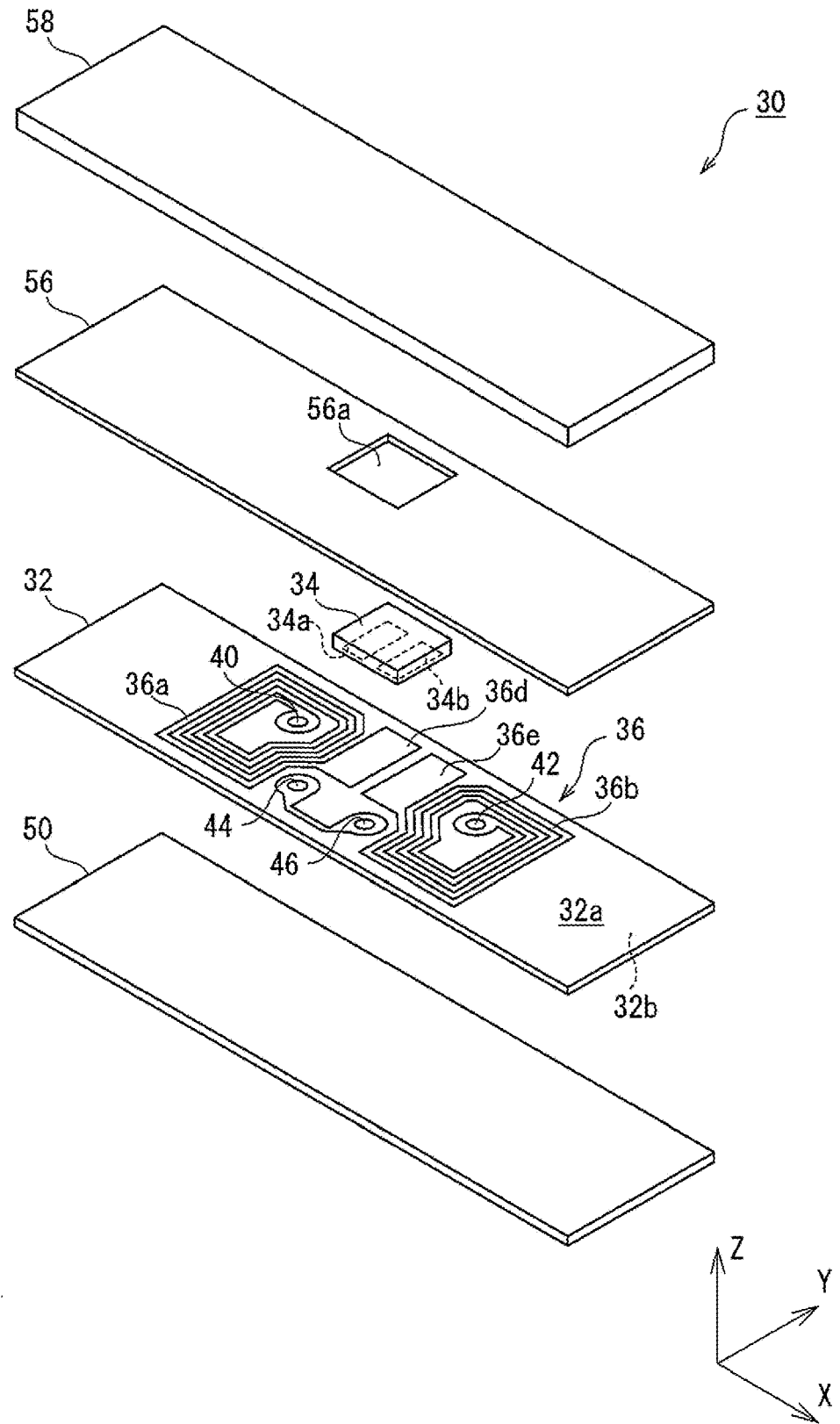
FIG. 3 is an exploded perspective view of an RFIC module.
Figure 4:
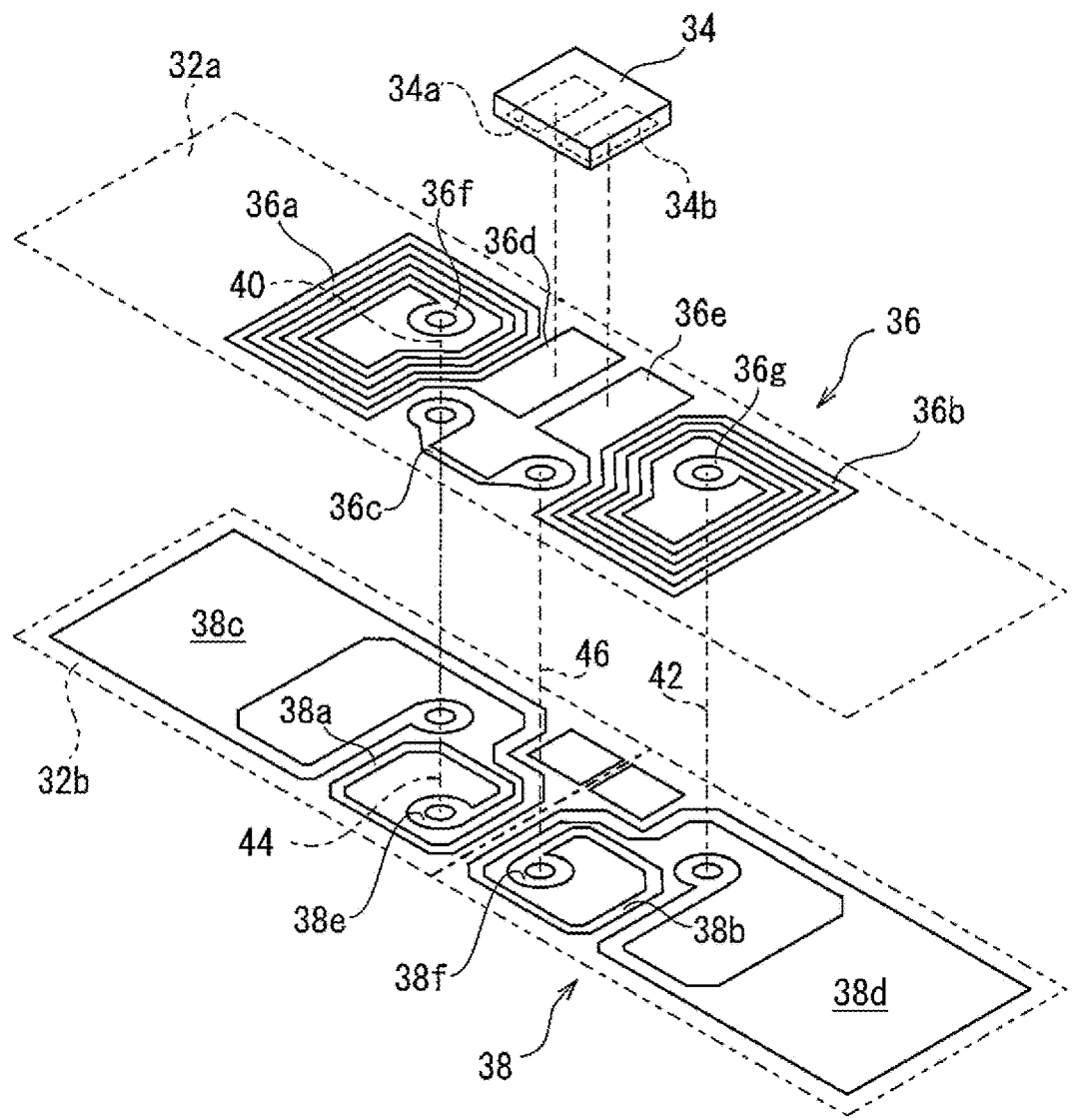
FIG. 4 is a perspective view showing an electric path in the RFIC module.
Figure 5:
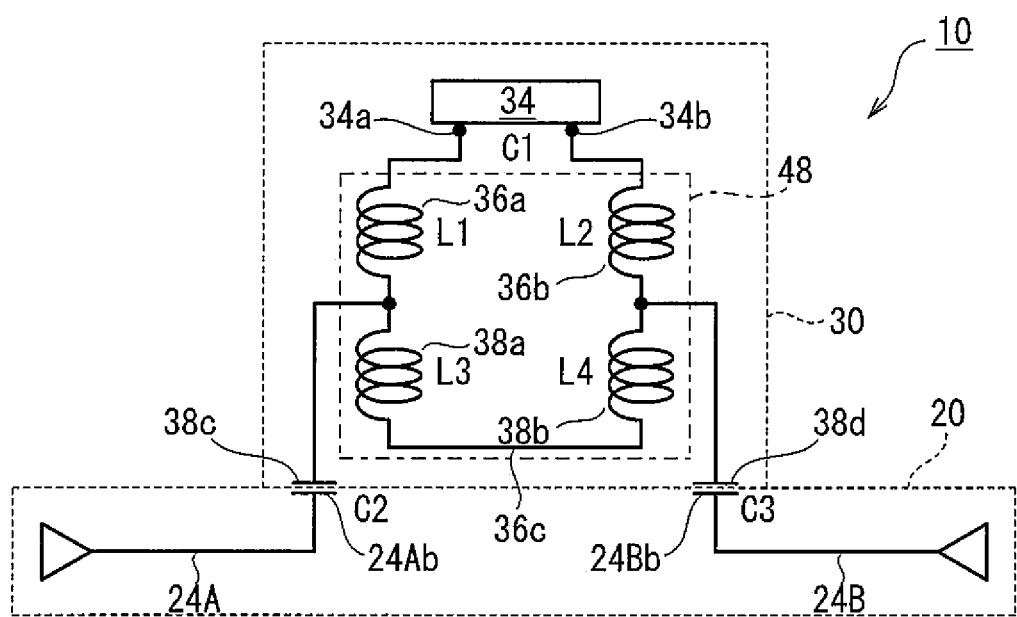
FIG. 5 is an equivalent circuit diagram of wireless communication device.

FIG. 3 is an exploded perspective view of the RFIC module. FIG. 4 is a perspective view showing an electric path in the RFIC module. FIG. 5 is an equivalent circuit diagram of the wireless communication device.

As shown in FIG. 3, the RFIC module 30 is a device performing wireless communication via the first and second antenna patterns 24A, 24B at a communication frequency of, for example, the 900 MHz band, i.e., the UHF band.

In this embodiment, the RFIC module 30 has a strip shape (e.g., elongated rectangular shape) and includes a module base material 32 and an RFIC (Radio-Frequency Integrated Circuit) chip 34 disposed on the module base material 32.

In this embodiment, the module base material 32 of the RFIC module 30 is a single sheet-shaped member and can be a flexible sheet made of an insulating material such as polyimide or a liquid crystal polymer, for example.

Moreover, the module base material 32 includes a first principal surface 32a and a second principal surface 32b that is a surface on the side opposite to the first principal surface 32a. As shown, the RFIC chip 34 is disposed on the first principal surface 32a.

The RFIC chip 34 is a chip driven at a frequency (e.g., communication frequency) in the UHF band and has a structure in which various elements are built in a semiconductor substrate made of a semiconductor, such as silicon. The RFIC chip 34 includes a first input/output terminal 34a and a second input/output terminal 34b. As shown in FIG. 5, the RFIC chip 34 includes an internal capacitance (capacitance: self-capacitance of the RFIC chip itself) C1.

Conductor patterns for connecting the RFIC chip 34 and the first and second antenna patterns 24A, 24B of the antenna member 20 are disposed on the module base material 32 of the RFIC module 30.

Specifically, as shown in FIG. 4, conductor patterns 36, 38 are formed on the first principal surface 32a and the second principal surface 32b, respectively, of the module base material 32.

In this embodiment, the conductor patterns 36, 38 are conductor patterns made of a conductor material such as silver, copper, or aluminum, for example. The conductor patterns 36, 38 electrically connect the first and second coupling portions 24Ab, 24Bb of the first and second antenna patterns 24A, 24B of the antenna member 20 to the first and second input/output terminals 34a, 34b of the RFIC chip 34.

In this embodiment, one of the conductor patterns 36 is disposed on the first principal surface 32a of the module base material 32 and includes first and second spiral coil portions 36a, 36b and a connecting portion 36c. The other conductor pattern 38 is disposed on the second principal surface 32b of the module base material 32 and includes third and fourth spiral coil portions 38a, 38b and first and second terminal electrodes 38c, 38d.

In the exemplary aspect, the first and second spiral coil portions 36a, 36b in the conductor pattern 36 have a spiral shape, are symmetrical to each other, and are arranged on both sides in the longitudinal direction (X-axis direction) of the module base material 32. The RFIC chip 34 and the connecting portion 36c are arranged between the first and second spiral coil portions 36a, 36b.

Moreover, the third and fourth spiral coil portions 38a, 38b in the conductor pattern 38 have a spiral shape and are symmetrical to each other. The portions 38a, 38b are arranged in the center in the longitudinal direction (X-axis direction) of the module base material 32. The rectangular first and second terminal electrodes 38c, 38d are arranged on both sides in the longitudinal direction with the third and fourth spiral coil portions 38a, 38b interposed therebetween.

The first spiral coil portion 36a in the conductor pattern 36 includes a land portion 36d connected to the first input/output terminal 34a of the RFIC chip 34 at an outer end thereof. The second spiral coil portion 36b includes a land portion 36e connected to the second input/output terminal 34b of the RFIC chip 34 at an outer end thereof. The first and second input/output terminals 34a, 34b are connected to the land portions 36d and 36e via solder, for example.

The first spiral coil portion 36a has a central end 36f connected to the first terminal electrode 38c via an interlayer connecting conductor 40 such as a via hole conductor penetrating the module base material 32. Similarly, the second spiral coil portion 36b has a central end 36g connected to the second terminal electrode 38d via an interlayer connecting conductor 42.

The third spiral coil portion 38a has an outer end connected to the first terminal electrode 38c. The fourth spiral coil portion 38b has an outer end connected to the second terminal electrode 38d. Central ends 38e, 38f of the third and fourth spiral coil portions 38a, 38b are connected to each other via interlayer connecting conductors 44, 46 and the connecting portion 36c.

As shown in FIG. 5, the first to fourth spiral coil portions 36a, 36b, 38a, 38b having a connection relationship described above provide a matching circuit 48 between the first/second input/output terminals 34a, 34b of the RFIC chip 34 and the first/second terminal electrodes 38c, 38d. Specifically, the first spiral coil portion 36a functions as an inductance element having an inductance L1. The second spiral coil portion 36b functions as an inductance element having an inductance L2. The third spiral coil portion 38a functions as an inductance element having an inductance L3.

The fourth spiral coil portion 38b functions as an inductance element having an inductance L4. The four inductances L1 to L4 and an internal capacitance C1 of the RFIC chip 34 form the matching circuit 48 for matching between the RFIC chip 34 and the first and second terminal electrodes 38c, 38d at a communication frequency.

As shown in FIG. 3, the module base material 32 is provided with a cover sheet 50 so as to protect the first and second terminal electrodes 38c, 38d of the conductor pattern 38 disposed on the second principal surface 32b of the module base material 32.

The cover sheet 50 is a sheet-shaped member made of an insulating material, for example, a PET film, and having an entirely uniform thickness according to an exemplary aspect. The cover sheet 50 is disposed on the second principal surface 32b of the module base material so as to cover at least the first and second terminal electrodes 38c, 38d. In this embodiment, the cover sheet 50 is disposed over the entire second principal surface 32b. Due to this cover sheet 50, the first and second terminal electrodes 38c, 38d are built in the RFIC module 30.

Figure 6:
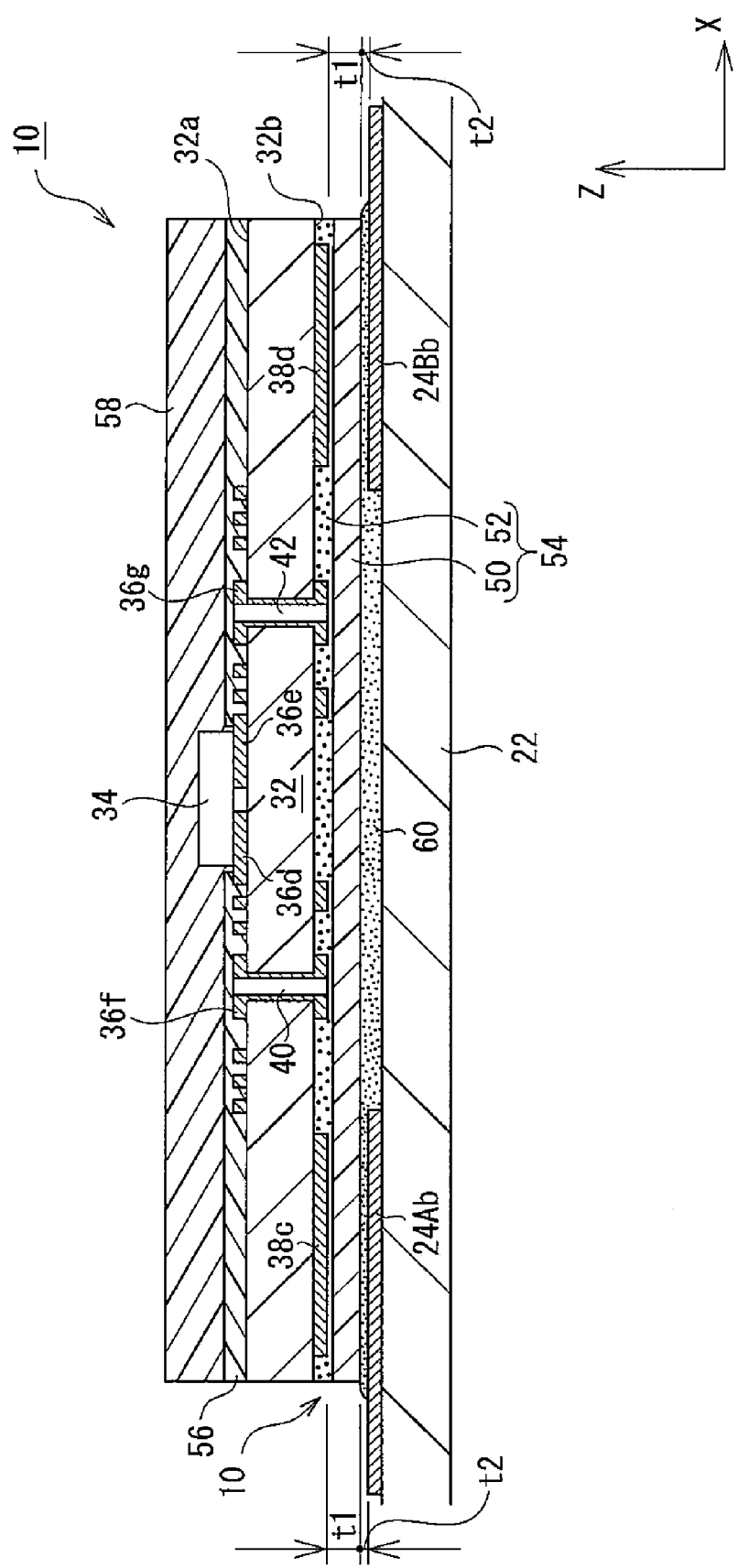
FIG. 6 is a cross-sectional view of the RFIC module and the wireless communication device in the vicinity thereof.

FIG. 6 is a cross-sectional view of the RFIC module and the wireless communication device in the vicinity thereof.

As shown in FIG. 6, the cover sheet 50 is bonded to the second principal surface 32b of the module base material 32 via an insulating adhesive agent (second adhesive layer) 52. In other words, the cover sheet 50 and the second adhesive layer 52 function as a cover layer 54 covering the first and second terminal electrodes 38c, 38d. The thickness of the second adhesive layer 52 is preferably larger than the thickness of the first and second terminal electrodes 38c, 38d (i.e., the thickness of the conductor pattern 38). As a result, an outer surface of the cover sheet 50 becomes flat (convex portions formed by the first and second terminal electrodes 38c, 38d do not appear on the outer surface).

In this embodiment, as shown in FIGS. 3 and 6, an insulating resist layer 56 covering and protecting the conductor pattern 36 is formed on the entire first principal surface 32a of the module base material 32. The resist layer 56 is provided with a resist opening 56a through which the RFIC chip 34 passes.

In this embodiment, as shown in FIGS. 3 and 6, a package layer 58 is disposed to cover and protect the RFIC chip 34 passing through the resist layer 56. The package layer 58 is produced by curing an insulating material, for example, an adhesive agent containing a thermoplastic resin as a main component. Moreover, the RFIC chip 34 is embedded in the package layer 58 and thereby protected without being exposed to the outside.

The cover sheet 50 (cover layer 54) and the package layer 58 form the RFIC module 30 into a rectangular parallelepiped shape (thin rectangular thin plate shape) with few irregularities, and as a result, the RFIC module 30 can easily be handled. For example, a suction nozzle in a mounting head of a component mounting device sucks the package layer 58, so that the mounting head can convey the RFIC module 30 in a stable state.

In an exemplary aspect, the RFIC module 30 as described above is manufactured as follows; however, the present invention is not limited thereto.

First, a roll sheet (finally cut into the multiple module base materials 32) having the multiple conductor patterns 36 formed on one surface and the multiple conductor patterns 38 formed on the other surface is prepared.

Subsequently, for example, by screen printing, the second adhesive layer 52 having a uniform thickness is formed (e.g., an adhesive agent is applied) on the entire other surface of the roll sheet. Another roll sheet (finally cut into the multiple cover sheets 50) is affixed onto the second adhesive layer 52.

Subsequently, a resist layer (finally cut into the multiple resist layers 56) is formed by, for example, screen printing, on the entire one surface of the roll sheet on which the multiple conductor patterns 36 are formed. In this case, the resist layer is formed leaving a portion on which the RFIC chip 34 is mounted (i.e., the resist opening 56a). The RFIC chip 34 is mounted on the portion of the roll sheet on which the resist opening 56a is formed by using a component mounting device, for example.

An adhesive agent (finally cut into the multiple package layers 58) is applied to the entire one surface of the roll sheet on which the RFIC chip 34 is mounted (i.e., onto the resist layer), and the applied adhesive agent is cured.

By cutting the roll sheet into multiple pieces, the multiple RFIC modules 30 are created.

The attachment of the RFIC module 30 to the antenna member 20 will hereinafter be described.

As shown in FIGS. 2 and 6, the RFIC module 30 is overlapped on the first principal surface 20a of the antenna member 20 and bonded to the antenna member 20 via the insulating first adhesive layer 60. The first adhesive layer 60 is a layer of an insulating adhesive agent, for example, an acrylic or epoxy adhesive agent. By adhesion, the first and second terminal electrodes 38c, 38d of the RFIC module 30 are maintained in a state of facing the first and second coupling portions 24Ab, 24Bb in the first and second antenna patterns 24A, 24B in the direction of overlapping of the RFIC module 30 and the antenna member 20 (Z-axis direction).

As shown in FIG. 6, the first adhesive layer 60 is interposed between the cover layer 54 of the RFIC module 30 and the antenna member 20 to bond them to each other. Therefore, the insulating cover layer 54 (in the case of this embodiment, the insulating cover sheet 50 and the second adhesive layer 52) and the insulating first adhesive layer 60 are present between the first terminal electrode 38c and the first coupling portion 24Ab of the first antenna pattern 24A and between the second terminal electrode 38d and the second coupling portion 24Bb of the second antenna pattern 24B. As a result, as shown in FIG. 5, a capacitance C2 is formed between the first terminal electrode 38c and the first coupling portion 24Ab, and a capacitance C3 is formed between the second terminal electrode 38d and the second coupling portion 24Bb. Moreover, the first terminal electrode 38c and the first coupling portion 24Ab are capacitively coupled, and the second terminal electrode 38d and the second coupling portion 24Bb are capacitively coupled.

As shown in FIG. 5, the capacitance C2 is formed between the first terminal electrode 38c and the first coupling portion 24Ab, and the capacitance C3 is formed between the second terminal electrode 38d and the second coupling portion 24Bb. As shown in FIG. 6, the capacitances C2, C3 are determined by a thickness t1 of the cover layer 54 and a thickness t2 of the first adhesive layer 60 (additionally, also determined by their dielectric constants and facing areas) between the first terminal electrode 38c and the first coupling portion 24Ab and between the second terminal electrode 38d and the second coupling portion 24Bb.

As shown in FIG. 6, between the first terminal electrode 38c and the first coupling portion 24Ab and between the second terminal electrode 38d and the second coupling portion 24Bb, a distance t1 from the surface of the RFIC module 30 (the outer surface of the cover sheet 50) in contact with the first adhesive layer 60 to the first and second terminal electrodes 38c, 38d is larger than the thickness t2 of the first adhesive layer 60. In other words, between the first terminal electrode 38c and the first coupling portion 24Ab and between the second terminal electrode 38d and the second coupling portion 24Bb, the thickness t1 of the cover layer 54 is larger than the thickness t2 of the first adhesive layer 60. In an exemplary aspect, thickness t1 is 10 µm and thickness t2 is 1 µm. The reason why the thickness t1 of the cover layer 54 is made larger than the thickness t2 of the first adhesive layer 60 will be described.

Figure 7:
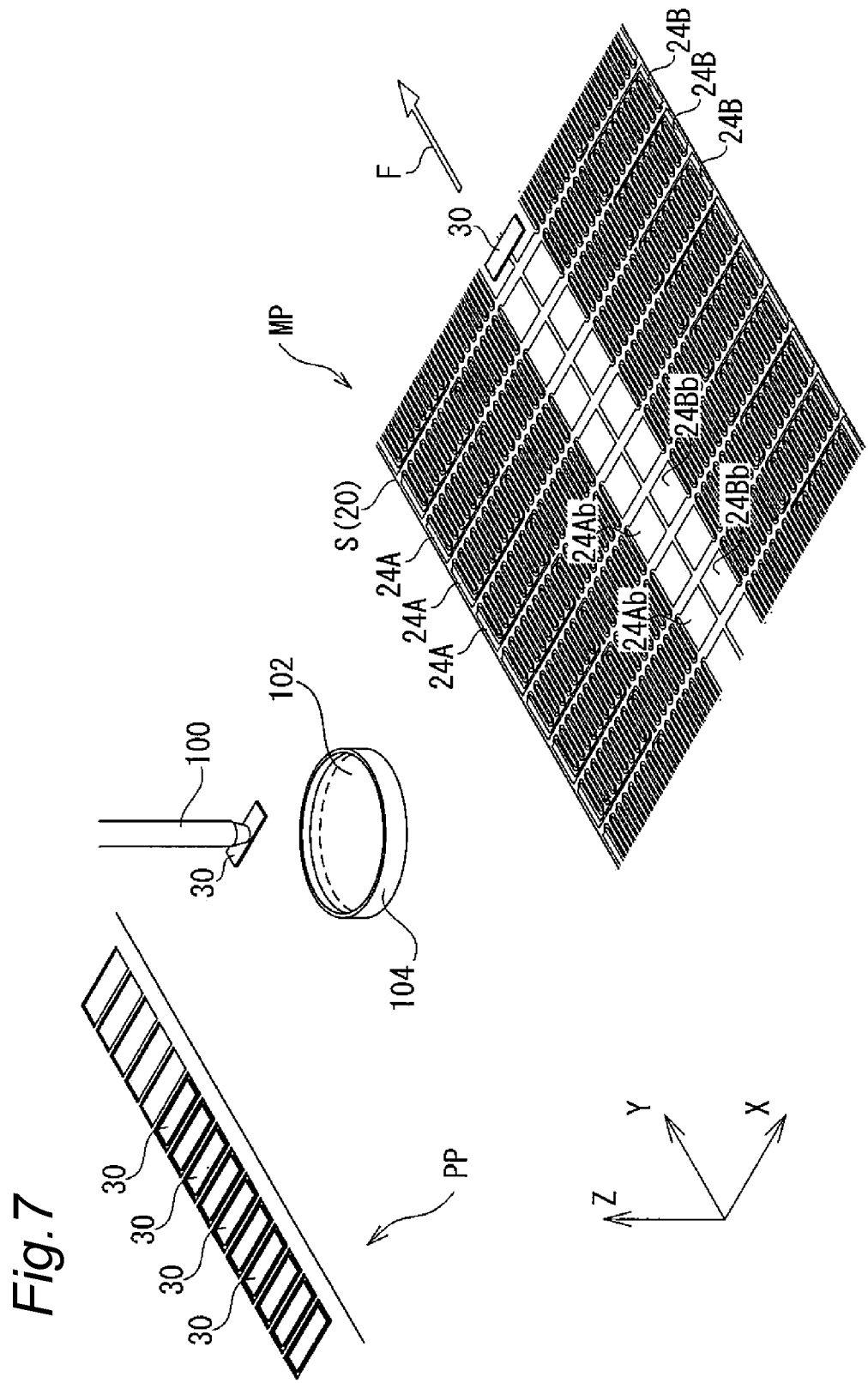
FIG. 7 is conceptual diagram for explaining an exemplary method of mounting the RFIC module on an antenna member.

FIG. 7 is a conceptual diagram for explaining an exemplary method of mounting the RFIC module on an antenna member.

As shown in FIG. 7, in this embodiment, the multiple first antenna patterns 24A and the multiple second antenna patterns 24B are formed on a roll sheets S (finally cut into multiple antenna members 20). The roll sheet S is conveyed in a supply direction F coinciding with the longitudinal direction thereof. A mounting head (not shown) of a component mounting device mounts the RFIC modules 30 on the roll sheet S.

The mounting head of the component mounting device includes multiple suction nozzles 100 sucking and holding the RFIC modules 30. Each of the multiple suction nozzles 100 is mounted movably in the vertical direction (the Z-axis direction) on the mounting head.

The mounting head is movable in the horizontal directions (the X-axis direction and the Y-axis direction) and the vertical direction (the Z-axis direction) and sucks the RFIC modules 30 conveyed to a component supply position PP by the multiple suction nozzles 100. The mounting head with the multiple suction nozzles 100 sucking and holding the RFIC modules 30 moves above a portion of the roll sheet S arranged at a mounting position MP. The suction nozzles 100 are then lowered, and the RFIC modules 30 held at the tips thereof are mounted on the roll sheet S.

As shown in FIG. 7, a liquid adhesive agent 102 (cured into the first adhesive layer 60) is applied to the RFIC module 30 sucked and held by the suction nozzle 102 of the mounting head during a period from the component supply position PP to the mounting position MP. Specifically, a coater 104 is arranged between the component supply position PP and the mounting position MP. For example, when the mounting head 100 is lowered and the cover layer 54 of the RFIC module 30 is brought into contact with a liquid surface of the liquid adhesive agent 102 on the coater 104, the liquid adhesive agent 102 is applied to the cover layer 54. The RFIC module 30 having the liquid adhesive agent 102 applied thereto is mounted on the roll sheet S, and after the mounting, the liquid adhesive agent 102 is cured, so that the RFIC module 30 is bonded to the roll sheet S via the first adhesive layer 60.

According to such a bonding method of the RFIC module 30, the RFIC module 30 can easily be bonded to the roll sheet S (the antenna member 20). However, the thickness t2 of the first adhesive layer 60 easily varies between the first terminal electrode 38c and the first coupling portion 24Ab and between the second terminal electrode 38d and the second coupling portion 24Bb. If the thickness t2 of the first adhesive layer 60 varies, a variation may also occur in electrical characteristics (particularly capacitance) between the first terminal electrode 38c and the first coupling portion 24Ab and between the second terminal electrode 38d and the second coupling portion 24Bb. As a result, variation may also occur in the communication characteristics of the wireless communication device.

As a countermeasure, as shown in FIG. 6, the thickness t1 of the cover layer 54 is made larger than the thickness t2 of the first adhesive layer 60 between the first terminal electrode 38c and the first coupling portion 24Ab and between the second terminal electrode 38d and the second coupling portion 24Bb. Therefore, even if the thickness t2 of the first adhesive layer 60 varies, the capacitance C2 between the first terminal electrode 38c and the first coupling portion 24Ab and the capacitance C3 between the second terminal electrode 38d and the second coupling portion 24Bb are hardly affected and do not substantially change. Specifically, since the thickness t1 of the cover layer 54 more dominantly affects the capacities C2, C3 as compared to the thickness t2 of the first adhesive layer 60, the influence of the variation in the thickness t2 of the first adhesive layer 60 on the capacities C2, C3 can be reduced.

As described above, the first and second terminal electrodes 38c, 38d of the RFIC module 30 including the RFIC chip 34 and the first and second coupling portions 24Ab, 24Bb in the first and second antenna patterns 24A, 24B can electrically be connected in the wireless communication device 10 while suppressing variations in electrical characteristics.

Additionally, as a secondary effect, since the first and second terminal electrodes 38c, 38d are built in the RFIC module 30, i.e., are not exposed to the outside, a damage such as corrosion is suppressed. As a result, the handleability and reliability of the RFIC module 30 are improved.

It is noted that although the exemplary aspects of the present invention has been described with reference to the embodiments described above, the embodiments of the present invention are not limited thereto.

For example, in the case of the embodiment described above, as shown in FIG. 3, the module base material 32 provided with the RFIC chip 34 and the first and second terminal electrodes 38c, 38d is a single sheet-shaped member in the RFIC module 30; however, the embodiments of the present invention are not limited thereto. Alternatively, the module base material can be a multilayer structure formed by laminating multiple sheet-shaped members. When the module base material is a multilayer structure, an RFIC chip may be built in the multilayer structure.

In the case of the embodiment described above, as shown in FIG. 3, the antenna pattern of the antenna member 20 is a dipole antenna and is made up of the first and second antenna patterns 24A, 24B. However, in an alternative embodiment, the antenna pattern of the antenna member can be a one-piece loop antenna. In this configuration, a first coupling portion is disposed at one end of the loop antenna, and a second coupling portion is disposed at the other end.

In the case of the embodiment described above, as shown in FIG. 5, the cover layer 54 is made up of the insulating cover sheet 50 and the second adhesive layer 52. However, the embodiments of the present invention are not limited thereto. For example, as with the package layer 58, an insulating material, for example, an adhesive agent containing a thermoplastic resin as a main component can be applied to the second principal surface 32b of the module base material 32, and the adhesive agent can be cured to produce the cover layer 54.

Furthermore, in the case of the embodiment described above, as shown in FIG. 7, a liquid adhesive agent 106 is applied to the RFIC module 30, and the RFIC module 30 having the adhesive agent 106 applied thereto is mounted on the roll sheet S (finally processed into the antenna member 20). However, the embodiments of the present invention are not limited thereto.

Figure 8:
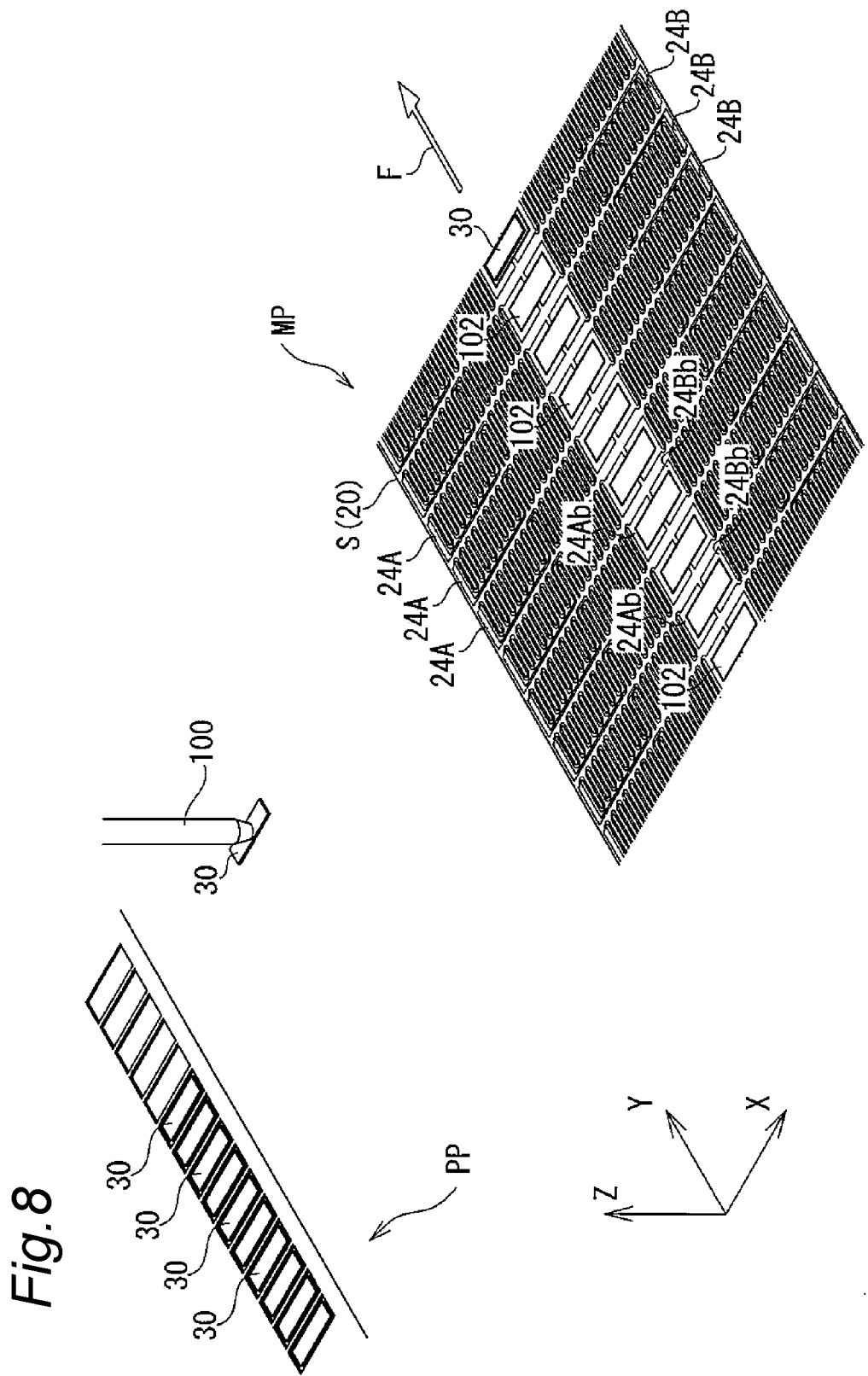
FIG. 8 is a conceptual diagram for explaining another exemplary method of mounting the RFIC module on an antenna member.

FIG. 8 is a conceptual diagram for explaining another exemplary method of mounting the RFIC module on an antenna member.

As shown in FIG. 8, the adhesive agent 102 (the first adhesive layer 60) for bonding the RFIC module 30 and the roll sheet S (the antenna member 20) can be applied to the roll sheet S. For example, the adhesive agent 102 may be applied onto the first and second coupling portions 24Ab, 24Bb in the roll sheet S. A dispenser may apply the adhesive agent 102 to a portion of the roll sheet S pulled out from a roll. Alternatively, the adhesive agent 102 may have already been applied to the roll sheet S when the roll sheet S is in the form of a roll. In this case, a pressure sensitive adhesive agent (sticking agent) is used as the adhesive agent 102 so that it does not cure in the roll sheet S in the roll-shaped stage, i.e., inside the roll.

The area of the first adhesive layer 60 (the adhesive agent 102) is preferably the same or larger than the area of the RFIC module 30. Specifically, when the RFIC module 30 is mounted on the roll sheet S (the antenna member 20), preferably, the contour line of the RFIC module 30 overlaps or is located inside the contour line of the first adhesive layer 60 when viewed in the lamination direction (Z-axis direction) of the RFIC module 30 and the roll sheet S.

Due to such mounting, even if the mounting position of the RFIC module 30 varies, the first adhesive layer 60 can be present entirely between the first terminal electrode 38c and the first coupling portion 24Ab and between the second terminal electrode 38d and the second coupling portion 24Bb. As a result, the capacitance therebetween becomes stable without variation during operation. Since the adhesive area of the RFIC module 30 also becomes stable without variation, the RFIC module 30 can be fixed to the roll sheet S with stable adhesive strength.

Figure 9:
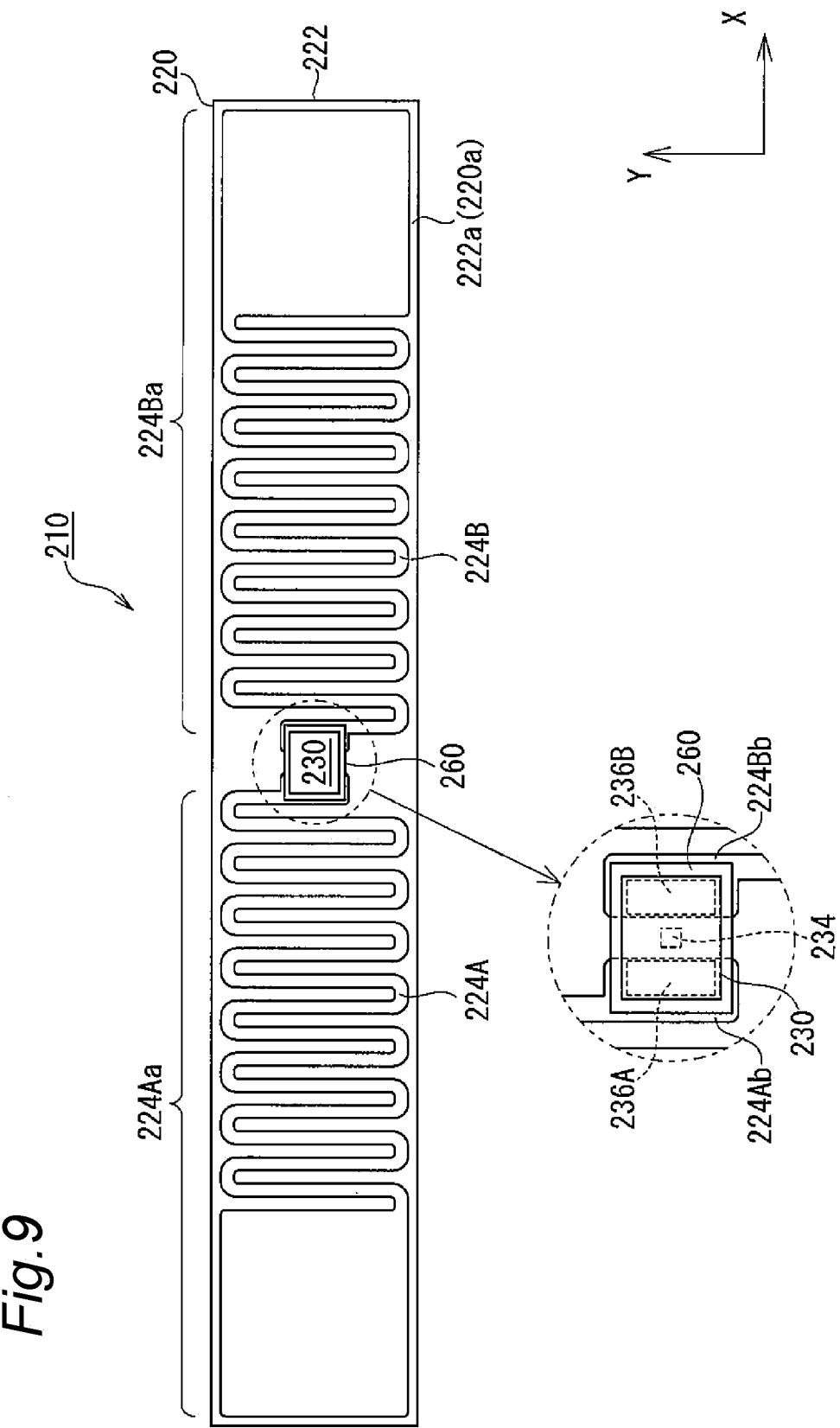
FIG. 9 is a top view of a wireless communication device according to another exemplary embodiment.

FIG. 9 is a top view of a wireless communication device according to another exemplary embodiment.

As shown in FIG. 9, an antenna member 220 of a wireless communication device 210 according to this exemplary embodiment has a strip shape (e.g., an elongated rectangular shape) and includes an antenna base material 222 and first and second antenna patterns 224A, 224B disposed on one surface 222a of the antenna base material 222 (a first principal surface 220a of the antenna member 220).

The first and second antenna patterns 224A, 224B include radiating portions 224Aa, 224Ba for transmitting and receiving radio waves and coupling portions 224Ab, 224Bb (e.g., first and second coupling portions) for electrically connecting to an RFIC module 230.

Although details will be described later, the first and second coupling portions 224Ab, 224Bb of the first and second antenna patterns 224A, 224B are electrically connected to terminal electrodes of the RFIC module 230.

Figure 10:
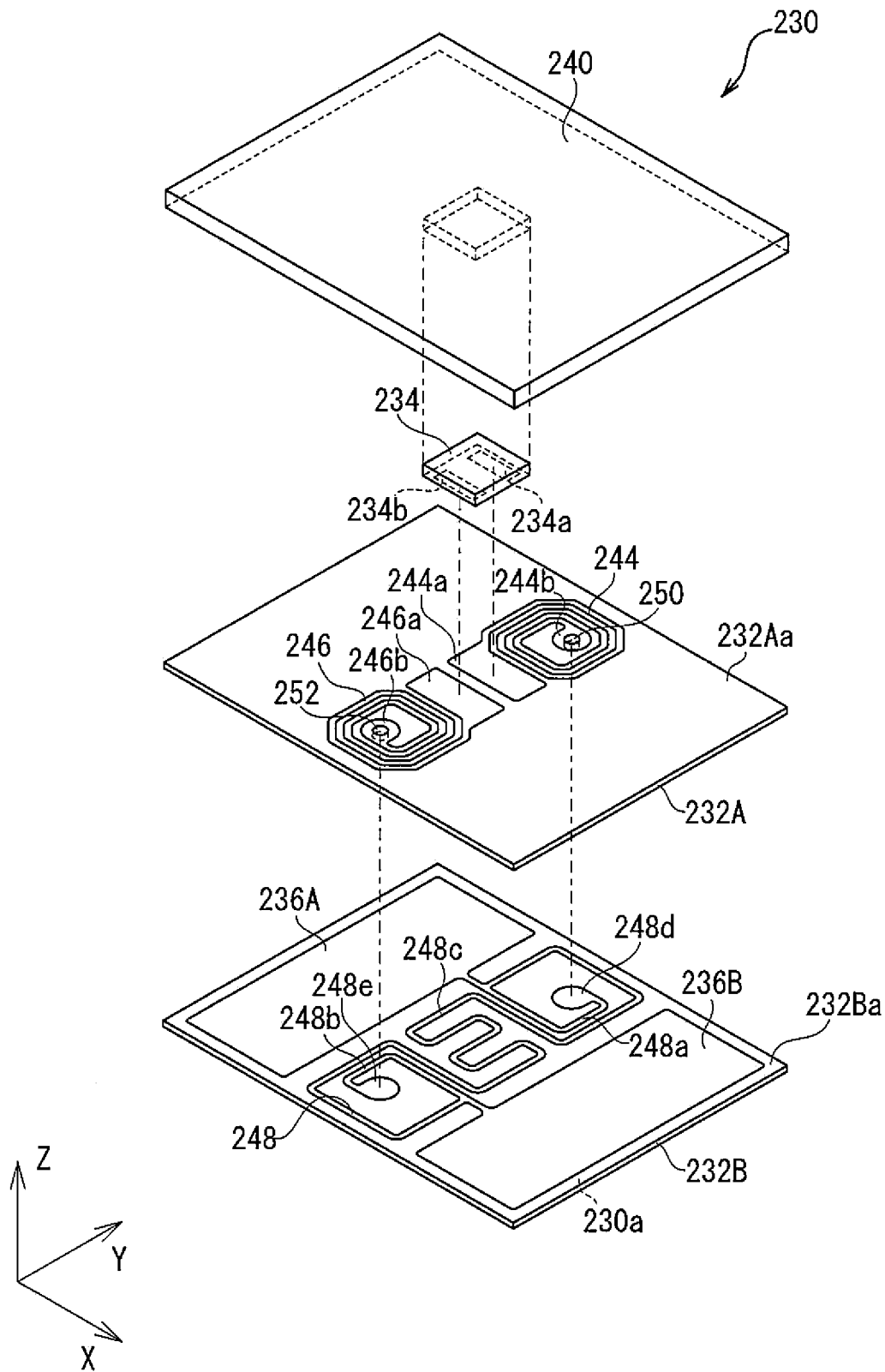
FIG. 10 is an exploded perspective view of an RFIC module according to the embodiment shown in FIG. 9.
Figure 11:
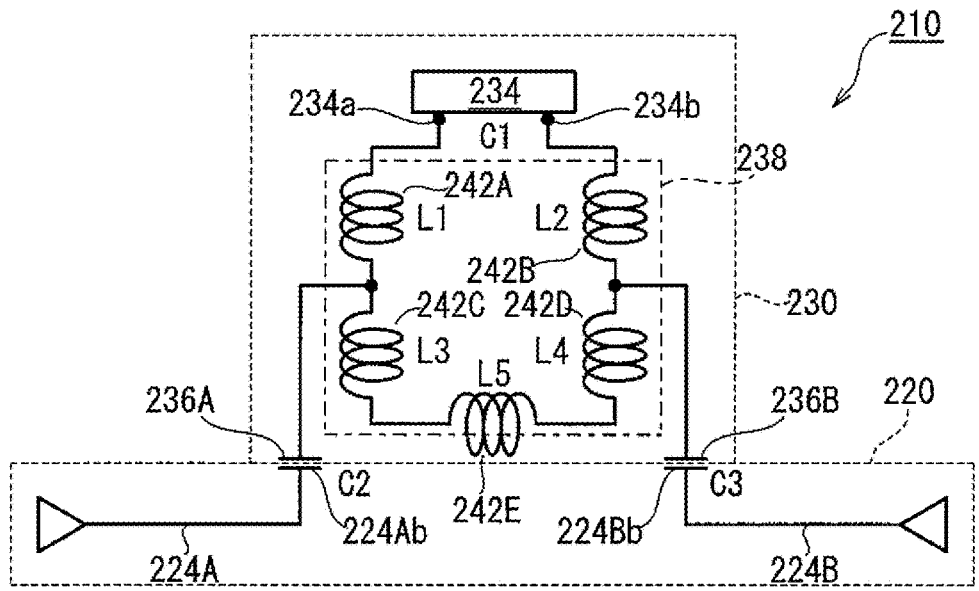
FIG. 11 is an equivalent circuit diagram of the wireless communication device according to the embodiment shown in FIG. 9.

FIG. 10 is an exploded perspective view of the RFIC module according to the exemplary embodiment. FIG. 11 is an equivalent circuit diagram of the wireless communication device according to the exemplary embodiment.

As shown in FIGS. 10 and 11, the RFIC module 230 is a device that performs wireless communication via the first and second antenna patterns 224A, 224B at a communication frequency of, for example, the 900 MHz band, i.e., the UHF band.

As shown in FIG. 10, in this embodiment, the RFIC module 230 is a multilayer structure. Specifically, the RFIC module 230 includes two thin plate-shaped insulating sheets 232A, 232B made of an insulating material and laminated as a module base material that is a main constituent element.

As shown in FIGS. 10 and 11, the RFIC module 230 includes an RFIC chip 234 and first and second terminal electrodes 236A, 236B connected to the RFIC chip 234. The RFIC module 230 includes a matching circuit 238 disposed between the RFIC chip 234 and the first and second terminal electrodes 236A, 236B. The RFIC module 230 has a structure in which the RFIC chip 234, the first and second terminal electrodes 236A, 236B, and the matching circuit 238 are incorporated.

The RFIC chip 234 is a chip driven at a frequency (e.g., communication frequency) in the UHF band and has a structure in which various elements are built in a semiconductor substrate made of a semiconductor such as silicon. The RFIC chip 234 includes a first input/output terminal 234a and a second input/output terminal 234b. As shown in FIG. 11, the RFIC chip 34 includes an internal capacitance (capacitance: self-capacitance of the RFIC chip itself) C1.

As shown in FIG. 10, the RFIC chip 234 is built in the RFIC module 230 that is a multilayer structure. Specifically, the RFIC chip 234 is arranged on the insulating sheet 232A and sealed in a resin package 240 formed on the insulating sheet 232A. The resin package 240 is made of an elastomer resin such as polyurethane or a hot melt resin, for example. In this configuration, the RFIC chip 234 is protected by the resin package 240.

The first and second terminal electrodes 236A, 236B are conductor patterns made of a conductor material such as silver, copper, or aluminum, for example, and are disposed on an inside surface 232Ba of the insulating sheet 232B (e.g., the surface on the side opposite to the first principal surface 230a and facing the insulating sheet 232A) forming the first principal surface 230a of the RFIC module 230. Specifically, the first and second terminal electrodes 236A, 236B are incorporated without being exposed to the outside of the RFIC module 230.

As shown in FIG. 11, the matching circuit 238 disposed between the RFIC chip 234 and the first and second terminal electrodes 236A, 236B comprises multiple inductance elements 242A to 242E.

Each of the multiple inductance elements 242A to 242E comprises a conductor pattern disposed on each of the insulating sheets 232A, 232B.

An outer surface 232Aa (e.g., the surface on which the resin package 240 is disposed) of the insulating sheet 232A of the RFIC module 230 is provided with conductor patterns 244, 246 made of a conductor material such as silver, copper, and aluminum, for example. Each of the conductor patterns 244, 246 is a spiral coil-shaped pattern and includes a land portion 244a, 246a at an outer circumferential end for electrical connection with the RFIC chip 234. The land portion 244a and the first input/output terminal 234a of the RFIC chip 234 are electrically connected via solder or a conductive adhesive agent, for example. Similarly, the land portion 246a and the second input/output terminal 234b are also electrically connected.

The one spiral coil-shaped conductor pattern 244 on the insulating sheet 232A forms the inductance element 242A having an inductance L1 as shown in FIG. 11. The other spiral coil-shaped conductor pattern 246 forms the inductance element 242B having an inductance L2.

The insulating sheet 232B adjacent to the insulating sheet 232A is provided with a conductor pattern 248 made of a conductor material such as silver, copper, or aluminum, for example. The conductor pattern 248 includes terminal electrodes 236A, 236B, spiral coil portions 248a, 248b, and a meander portion 248c. Moreover, in the insulating sheet 232B, the spiral coil portions 248a, 248b and the meander portion 248c are arranged between the first and second terminal electrodes 236A, 236B.

The one spiral coil portion 248a in the conductor pattern 248 on the insulating sheet 232B is electrically connected to the first terminal electrode 236A. A central end 248d of the spiral coil portion 248a is electrically connected via an interlayer connecting conductor 250 such as a through-hole conductor formed in the insulating sheet 232A to a central end 244b of the spiral coil-shaped conductor pattern 244 on the insulating sheet 232A. The spiral coil portion 248a is configured such that a current flowing through the conductor pattern 244 and a current flowing through the spiral coil portion 248a have the same circumferential direction. Additionally, as shown in FIG. 11, the spiral coil portion 248a constitutes the inductance element 242C having an inductance L3.

The other spiral coil portion 248b in the conductor pattern 248 on the insulating sheet 232B is electrically connected to the second terminal electrode 236B. A central end 248e of the spiral coil portion 248b is electrically connected via an interlayer connecting conductor 252 such as a through-hole conductor formed in the insulating sheet 232A to a central end 246b of the spiral coil-shaped conductor pattern 246 on the insulating sheet 232A. The spiral coil portion 248b is configured such that a current flowing through the conductor pattern 246 and a current flowing through the spiral coil portion 248b have the same circumferential direction. Additionally, as shown in FIG. 11, the spiral coil portion 248b constitutes the inductance element 242D having an inductance L4.

As further shown, the meander portion 248c in the conductor pattern 248 on the insulating sheet 232B electrically connects an outer circumferential end of the one spiral coil portion 248a and an outer circumferential end of the other spiral coil portion 248b. Moreover, the meander portion 248c forms the inductance element 242E having an inductance L5.

The matching circuit 238 including the inductance elements 242A to 242E as described above (including the self-capacitance C1 of the RFIC chip 234) matches the impedance between the RFIC chip 234 and the first and second terminal electrodes 236A, 236B at a predetermined frequency (communication frequency).

Figure 12:
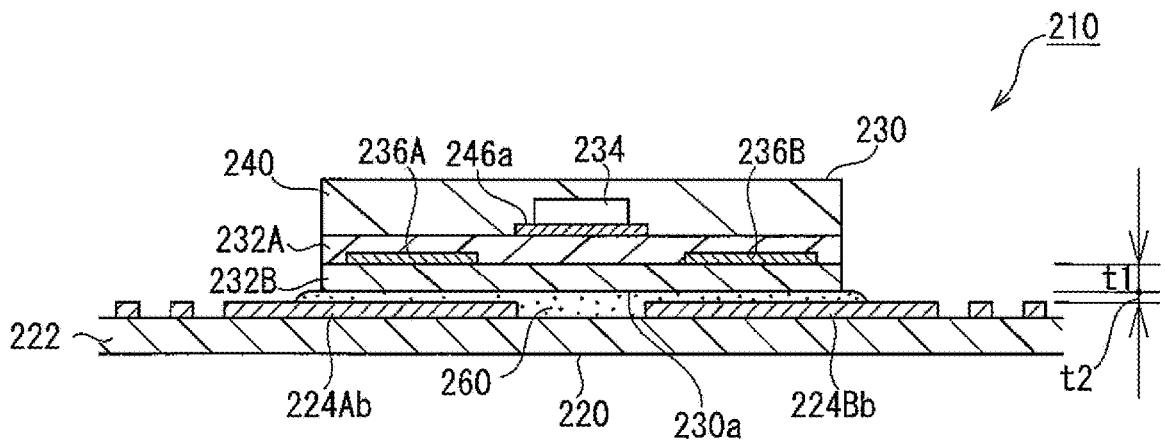
FIG. 12 is a cross-sectional view of the RFIC module and the wireless communication device in the vicinity thereof according to the embodiment shown in FIG. 9.

FIG. 12 is a cross-sectional view of the RFIC module and the wireless communication device in the vicinity thereof according to the other embodiment.

As shown in FIG. 12, in the wireless communication device 210, the RFIC module 230 is mounted on an antenna base material 220 via an insulating adhesive layer 260. As a result, the first terminal electrode 236A of the RFIC module 230 and the first coupling portion 224Ab in the first antenna pattern 224A of the antenna base material 220 face each other. Similarly, the second terminal electrode 236B and the second coupling portion 224Bb face each other.

As shown in FIG. 12, between the first terminal electrode 236A and the first coupling portion 224Ab and between the second terminal electrode 236B and the second coupling portion 224Bb, the distance t1 from the surface (the first principal surface 230a) of the RFIC module 230 in contact with the adhesive layer 260 to the first and second terminal electrodes 236A, 236B is larger than the thickness t2 of the adhesive layer 260. In other words, the thickness t1 of the insulating sheet 232B is larger than the thickness t2 of the adhesive layer 260. Due to this configuration, the first terminal electrode 236A and the first coupling portion 224Ab are capacitively coupled, and the second terminal electrode 236B and the second coupling portion 224Bb are capacitively coupled.

Additionally, in the case of the RFIC module 30 shown in FIG. 5, the matching circuit 48 is disposed between the RFIC chip 34 and the first and second terminal electrodes 38c, 38d. In the case of the RFIC module 230 shown in FIG. 11, the matching circuit 238 is disposed between the RFIC chips 234 and the first and second terminal electrodes 236A, 236B. However, it is noted that the exemplary embodiments of the present invention are not limited thereto.

Figure 13:
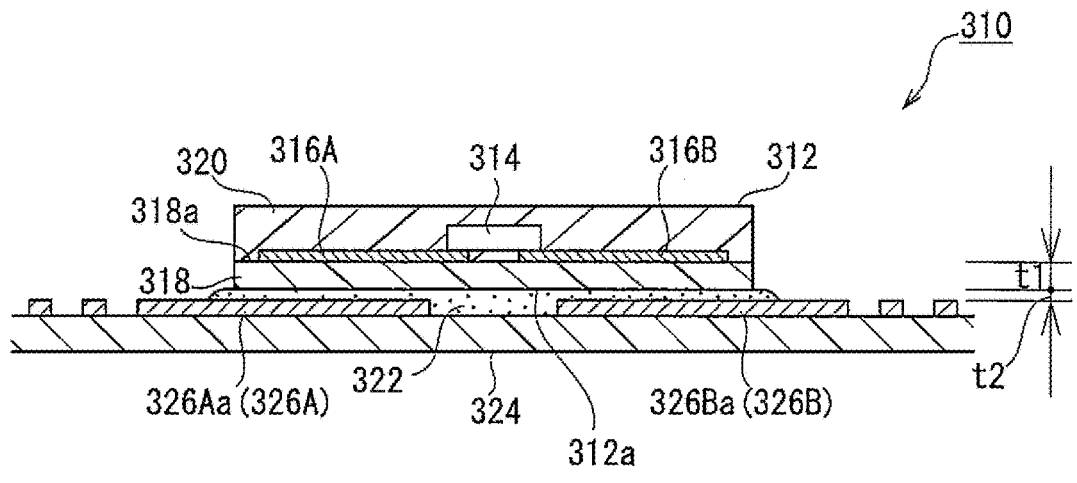
FIG. 13 is a cross-sectional view of an RFIC module and a wireless communication device in the vicinity thereof according to another exemplary embodiment.

FIG. 13 is a cross-sectional view of an RFIC module and a wireless communication device in the vicinity thereof according to yet another exemplary embodiment.

As shown in FIG. 13, an RFIC module 312 of a wireless communication device 310 does not include a matching circuit. Specifically, the RFIC chip 314 is directly connected to first and second terminal electrodes 316A, 316B. Therefore, the RFIC chip 314 and the first and second terminal electrodes 316A, 316B are matched without need for a matching circuit.

Specifically, the first and second terminal electrodes 316A, 316B are disposed on a first principal surface 318a of a module base material 318 having insulation properties, and an RFIC chip 314 is directly connected to the first and second terminal electrodes 316A, 316B. The first principal surface 318a of the module base material 318 is provided with a package layer 320 covering the RFIC chip 314 and the first and second terminal electrodes 316A, 316B. As a result, the RFIC chip 314 and the first and second terminal electrodes 316A, 316B are built in the RFIC module 312.

As shown in FIG. 13, in the wireless communication device 310 according to the exemplary embodiment, the RFIC module 312 is mounted on an antenna member 324 via an insulating adhesive layer 322. As a result, the first terminal electrode 316A of the RFIC module 312 and a first coupling portion 326Aa in a first antenna pattern 326A of the antenna member 324 face each other. Similarly, the second terminal electrode 316B and a second coupling portion 326Ba in a second antenna pattern 326B face each other.

As shown in FIG. 13, between the first terminal electrode 316A and the first coupling portion 326Aa and between the second terminal electrode 316B and the second coupling portion 326Ba, the distance t1 from a surface 312a of the RFIC module 312 in contact with the adhesive layer 322 to the first and second terminal electrodes 316A, 316B is larger than the thickness t2 of the adhesive layer 322. In other words, the thickness t1 of the module base material 318 is larger than the thickness t2 of the adhesive layer 322. Due to this configuration, the first terminal electrode 316A and the first coupling portion 326Aa are capacitively coupled, and the second terminal electrode 316B and the second coupling portion 316Ba are capacitively coupled.

A modification of the wireless communication device 310 according to the exemplary embodiment shown in FIG. 13 will be described.

Figure 14:
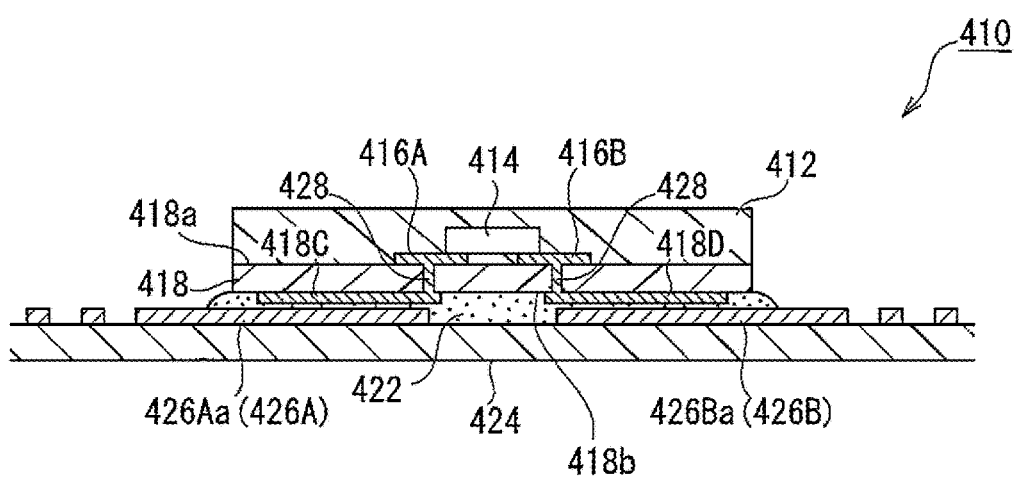
FIG. 14 is a cross-sectional view of an RFIC module and a wireless communication device in the vicinity thereof in a modification of the exemplary embodiment of FIG. 13.

FIG. 14 is a cross-sectional view of an RFIC module and a wireless communication device in the vicinity thereof in a modification of the exemplary embodiment of FIG. 13.

As shown in FIG. 14, an RFIC module 412 in a wireless communication device 410 of the modification has third and fourth exposed terminal electrodes 416C, 416D exposed to the outside on a second principal surface 418b of a module base material 418. The third and fourth terminal electrodes 416C, 416D are connected via an interlayer connecting conductor 428 penetrating the module base material 418 to first and second terminal electrodes 416A, 416B on a first principal surface 418a of the module base material 418. The RFIC chip 414 is connected to the first and second terminal electrodes 416A, 416B.

As shown in FIG. 14, in the wireless communication device 410 of the modification, the RFIC module 412 is mounted on an antenna member 424 via an insulating adhesive layer 422. As a result, the third terminal electrode 416C of the RFIC module 412 and a first coupling portion 426Aa in a first antenna pattern 426A of the antenna member 424 face each other and are capacitively coupled. Similarly, the fourth terminal electrode 416D and a second coupling portion 426Ba in a second antenna pattern 426B face each other and are capacitively coupled.

In general, it is noted that although some embodiments of the present invention have been described, it is apparent for those skilled in the art that at least one embodiment can entirely or partially be combined with a certain embodiment to form a further embodiment according to the present invention.

The exemplary embodiments of the present invention provide for a wireless communication device having an RFIC module including an RFIC chip and an antenna.

EXPLANATIONS OF LETTERS OR NUMERALS 10 wireless communication devices
20 antenna member
22 antenna base material
24A antenna pattern (first antenna pattern)
24B antenna pattern (second antenna pattern)
24Ab first coupling portion
24Bb second coupling portion
30 RFIC module
34 RFIC chip
38c first terminal electrode
38d second terminal electrode
60 first adhesive layer

What is claimed:

1. A wireless communication device comprising:
an RFIC module including an RFIC chip and first and second terminal electrodes connected to the RFIC chip;
an antenna member including an antenna base material and an antenna pattern disposed on the antenna base material and including first and second coupling portions that face the first and second terminal electrodes of the RFIC module, respectively; and
an insulating adhesive layer that bonds the RFIC module to the antenna member, with the insulating adhesive layer being interposed between the RFIC module and the antenna member,
wherein, between the first terminal electrode and the first coupling portion and between the second terminal electrode and the second coupling portion, a distance from a surface of the RFIC module in contact with the insulating adhesive layer to each of the first and second terminal electrodes, respectively, is larger than a thickness of the insulating adhesive layer.

2. The wireless communication device according to claim 1,
wherein the RFIC module includes a module base material, the RFIC chip is disposed on the module base material, the first and second terminal electrodes are disposed on the module base material and connected to the RFIC chip, and
wherein an insulating cover layer is disposed on the module base material to cover the first and second terminal electrodes.

3. The wireless communication device according to claim 2, wherein the insulating cover layer of the RFIC module and the antenna member are bonded to each other by the insulating adhesive layer interposed therebetween.

4. The wireless communication device according to claim 3, wherein, between the first terminal electrode and the first coupling portion and between the second terminal electrode and the second coupling portion, a thickness of the cover layer of the RFIC module is larger than the thickness of the insulating adhesive layer.

5. The wireless communication device according to claim 3, wherein the cover layer includes a cover sheet made of an insulating material and an additional insulating adhesive layer interposed between the cover sheet and the module base material to bond the cover sheet to the module base material.

6. The wireless communication device according to claim 2, wherein the module base material is a single sheet-shaped member, the RFIC chip is disposed on a first principal surface of the module base material, and the first and second terminal electrodes are disposed on a second principal surface on the side opposite to the first principal surface.

7. The wireless communication device according to claim 6, further comprising a package layer that is disposed on an entirety of the first principal surface of the module base material so that the RFIC chip is embedded therein.

8. The wireless communication device according to claim 1, wherein the RFIC module includes a matching circuit configured to match between the RFIC chip and the first and second terminal electrodes.

9. The wireless communication device according to claim 8, wherein the matching circuit is disposed between the RFIC chip and the first and second terminal electrodes.

10. The wireless communication device according to claim 1, wherein the distance from the surface of the RFIC module in contact with the insulating adhesive layer to each of the first and second terminal electrodes extends in a thickness direction that is perpendicular to a principal surface of the insulating adhesive layer, and the thickness of the insulating adhesive layer comprises a height in the thickness direction.

11. The wireless communication device according to claim 1, wherein the distance from the surface of the RFIC module in contact with the insulating adhesive layer to each of the first and second terminal electrodes is 10 μm, and the thickness of the first adhesive layer 1 μm.

12. The wireless communication device according to claim 1, wherein the RFIC chip is directly connected to first and second terminal electrodes.

13. A wireless communication device comprising:
an RFIC module including an RFIC chip and first and second terminal electrodes connected to the RFIC chip;
an antenna member including an antenna base material and an antenna pattern disposed on the antenna base material and including first and second coupling portions that face the first and second terminal electrodes of the RFIC module, respectively, in a thickness direction of the wireless communication device; and
an insulating adhesive layer that bonds the RFIC module to the antenna member, with the insulating adhesive layer being interposed between the RFIC module and the antenna member in the thickness direction,
wherein a distance in the thickness direction from a surface of the RFIC module in contact with the insulating adhesive layer to each of the first and second terminal electrodes, respectively, is larger than a thickness of the insulating adhesive layer in the thickness direction.

14. The wireless communication device according to claim 13,
wherein the RFIC module includes a module base material, the RFIC chip is disposed on the module base material, the first and second terminal electrodes are disposed on the module base material and connected to the RFIC chip, and
wherein an insulating cover layer is disposed on the module base material to cover the first and second terminal electrodes.

15. The wireless communication device according to claim 14,
wherein the insulating cover layer of the RFIC module and the antenna member are bonded to each other by the insulating adhesive layer interposed therebetween, and
wherein, between the first terminal electrode and the first coupling portion and between the second terminal electrode and the second coupling portion, the cover layer of the RFIC module has a thickness that is larger than the thickness of the insulating adhesive layer.

16. The wireless communication device according to claim 15, wherein the distance from the surface of the RFIC module in contact with the insulating adhesive layer to each of the first and second terminal electrodes is 10 µm, and the thickness of the first adhesive layer 1 µm.

17. A method of manufacturing a wireless communication device, the method comprising:
preparing an RFIC module having an RFIC chip and first and second terminal electrodes connected to the RFIC chip;
preparing an antenna member that includes an antenna base material and an antenna pattern disposed on the antenna base material and includes first and second coupling portions that face the first and second terminal electrodes of the RFIC module;
bonding the RFIC module to the antenna member by an insulating adhesive layer interposed therebetween; and
interposing the insulating adhesive layer between a cover layer of the RFIC module and the antenna member so that a distance from a surface of the RFIC module in contact with the first adhesive layer to each of the first and second terminal electrodes, respectively, is larger than a thickness of the first adhesive layer at least at a position between the first terminal electrode and the first coupling portion and at a position between the second terminal electrode and the second coupling portion.

18. The method of manufacturing a wireless communication device according to claim 17, wherein the insulating adhesive layer is a liquid adhesive agent before curing.

19. The method of manufacturing a wireless communication device according to claim 18, further comprising mounting the RFIC module on the antenna member after the liquid adhesive agent is applied to the cover layer of the RFIC module.

20. The method of manufacturing a wireless communication device according to claim 17, wherein the distance from the surface of the RFIC module in contact with the first adhesive layer to each of the first and second terminal electrodes extends in a thickness direction that is perpendicular to a principal surface of the insulating adhesive layer, and the thickness of the insulating adhesive layer comprises a height of the insulating adhesive layer in the thickness direction.

* * * * *